United States Patent
Kim et al.

(10) Patent No.: US 11,272,022 B2
(45) Date of Patent: Mar. 8, 2022

(54) SERVER FOR GENERATING INTEGRATED USAGE LOG DATA AND OPERATING METHOD THEREOF

(71) Applicant: Coupang Corp., Seoul (KR)

(72) Inventors: Young Jin Kim, Seoul (KR); Jin Su Lee, Seoul (KR); Su Ji Woo, Seoul (KR); Suk Min Ahn, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/996,765

(22) Filed: Aug. 18, 2020

(65) Prior Publication Data

US 2021/0306432 A1 Sep. 30, 2021

(30) Foreign Application Priority Data

Mar. 31, 2020 (KR) .......... 10-2020-0039111

(51) Int. Cl.
| | |
|---|---|
| G06F 15/16 | (2006.01) |
| H04L 67/50 | (2022.01) |
| G06F 16/955 | (2019.01) |
| H04L 67/02 | (2022.01) |
| H04L 67/303 | (2022.01) |

(52) U.S. Cl.
CPC .......... *H04L 67/22* (2013.01); *G06F 16/9566* (2019.01); *H04L 67/02* (2013.01); *H04L 67/303* (2013.01)

(58) Field of Classification Search
None
See application file for complete search history.

(56) References Cited

U.S. PATENT DOCUMENTS

| | | | | |
|---|---|---|---|---|
| 2010/0235494 A1* | 9/2010 | Sood | ........... | H04L 67/22 709/224 |
| 2019/0163824 A1* | 5/2019 | Pal | ........... | G06F 16/951 |

FOREIGN PATENT DOCUMENTS

| | | | |
|---|---|---|---|
| JP | 2002-049553 | A | 2/2002 |
| JP | 2010-514060 | A | 4/2010 |
| JP | 2010-122739 | A | 6/2010 |
| JP | 2011-070245 | A | 4/2011 |
| JP | 2012-173818 | A | 9/2012 |
| JP | 2012-208594 | A | 10/2012 |
| JP | 2013-012037 | A | 1/2013 |
| JP | 2015-064849 | A | 4/2015 |
| KR | 10-2001-0104421 | A | 11/2001 |
| KR | 10-2002-0017177 | A | 3/2002 |

(Continued)

OTHER PUBLICATIONS

International Search Report dated Dec. 1, 2020, issued in PCT/KR2020/009489.

*Primary Examiner* — Phuoc H Nguyen
(74) *Attorney, Agent, or Firm* — Knobbe, Martens, Olson & Bear, LLP

(57) ABSTRACT

Provided is a server and an operation method of the server, the method including providing a system including a plurality of domain accessible by a plurality of electronic devices to at least one of the plurality of electronic devices, acquiring, from at least one of the plurality of electronic devices, usage log data of a domain in which an input to a component of the system is identified among the plurality of domains or a domain having a change of at least a portion of a uniform resource locator (URL) among the plurality of domains, and generating integrated usage log data of the system based on the acquired usage log data.

15 Claims, 10 Drawing Sheets

(56) References Cited

FOREIGN PATENT DOCUMENTS

| | | |
|---|---|---|
| KR | 10-2006-0010842 A | 2/2006 |
| KR | 10-2007-0016863 A | 2/2007 |
| KR | 10-2009-0001751 A | 1/2009 |
| KR | 10-0931328 B1 | 12/2009 |
| KR | 10-2017-0043259 A | 4/2017 |
| KR | 10-1885430 B1 | 7/2018 |
| WO | WO 2005/003931 A2 | 1/2005 |
| WO | WO 2008/079402 A1 | 7/2008 |

* cited by examiner

SERVER FOR GENERATING INTEGRATED USAGE LOG DATA AND OPERATING METHOD THEREOF

BACKGROUND

Technical Field

This disclosure relates to a server for acquiring usage log data of a plurality of domains of a system and an operation method thereof.

Description of the Related Art

In general, an act of recording a status or operation information of a system over time during an operation of the system may be referred to as logging. A record created based on the logging may be referred to as a log. A system that generates (or collects) the log through the logging may be referred to as a logging system.

The logging system may record the status or operation information of the system simply over time irrespective of characteristics of the system. Therefore, there is a desire for a method for efficiently generating a log in consideration of the characteristics of the system.

SUMMARY

Technical Goals

An aspect provides a server and an operation method thereof, the server that generates integrated usage log data of a system including a plurality of domains based on acquisition of usage log data for each of the plurality of domains in consideration of characteristics of the system, thereby more efficiently generating a log of the system.

Technical goals to be achieved by the present embodiments are not limited to the above-described technical tasks and may further include other technical tasks.

Technical Solutions

According to a first embodiment, there is provided an operation method of a server, the method including providing a system including a plurality of domain accessible by a plurality of electronic devices to at least one of the plurality of electronic devices, acquiring, from at least one of the plurality of electronic devices, usage log data of a domain in which an input to a component of the system is identified among the plurality of domains or a domain having a change of at least a portion of a uniform resource locator (URL) among the plurality of domains, and generating integrated usage log data of the system based on the acquired usage log data.

According to a second embodiment, there is also provided a server including a communicator configured to provide a system including a plurality of domain accessible by a plurality of electronic devices to at least one of the plurality of electronic devices and acquire, from at least one of the plurality of electronic devices, usage log data of a domain in which an input to a component of the system is identified among the plurality of domains or a domain having a change of at least a portion of a URL among the plurality of domains, and a controller configured to generate integrated usage log data of the system based on the acquired usage log data.

According to a third embodiment, there is also provided a non-transitory computer-readable recording medium including a computer program for performing an operation method of a server, the method including providing a system including a plurality of domain accessible by a plurality of electronic devices to at least one of the plurality of electronic devices, acquiring, from at least one of the plurality of electronic devices, usage log data of a domain in which an input to a component of the system is identified among the plurality of domains or a domain having a change of at least a portion of a URL among the plurality of domains, and generating integrated usage log data of the system based on the acquired usage log data.

Details of other embodiments are included in the detailed description and the accompanying drawings.

Effects

According to example embodiments, a server and an operation method thereof may acquire usage log data from each of a plurality of domains, generate integrated usage log data for an entire system including the plurality of domains, and provide the generated integrated usage log data, so that an analysis on the entire system divided into the plurality of domains is performed with increased efficiency.

Further, according to example embodiments, a server and an operation method thereof may acquire usage log data based on an input to a component or a change of a URL of a domain such that usage log data requested to be analyzed is selectively acquired, which may increase efficiency and ease of generating and analyzing the integrated usage log data.

Effects of the present disclosure are not limited to the effects mentioned above and other effects not mentioned will become apparent to those skilled in the art from the description of the claims.

DETAILED DESCRIPTION

Terms used in embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element.

Throughout the specification, the expression "at least one of A, B, and C" may include the following meanings: A alone; B alone; C alone; both A and B together; both A and C together; both B and C together; and all three of A, B, and C together.

The term "terminal" mentioned below may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, embodiments of the present disclosure will be described in detail with reference to the drawings so that those skilled in the art can easily carry out the present disclosure. However, the present disclosure may be implemented in various different forms but it is not limited to the exemplary embodiments described herein.

Hereinafter, example embodiments of the present disclosure will be described with reference to the drawings.

Figure 1:
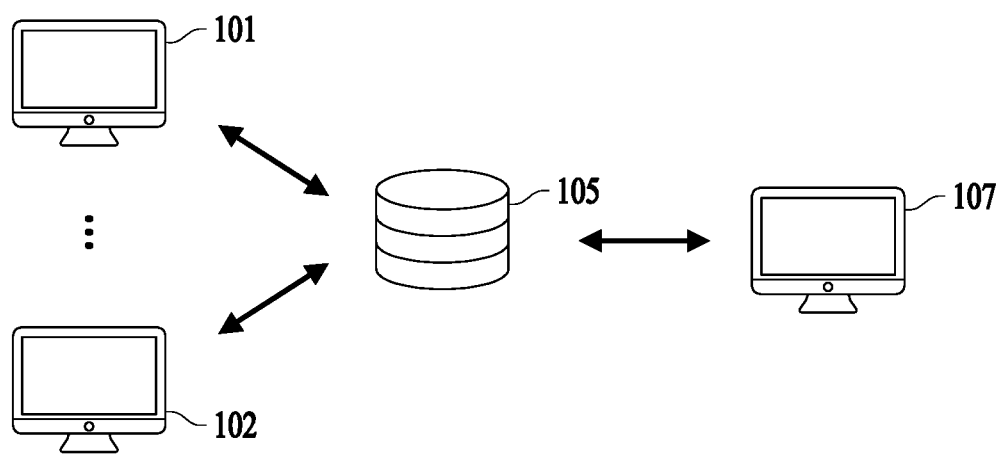
FIG. 1 is a schematic diagram illustrating a connection relationship of a server according to an example embodiment.

FIG. 1 is a schematic diagram illustrating a connection relationship of a server according to an example embodiment. Specifically, FIG. 1 illustrates a connection relationship of a plurality of electronic devices, a server 105, and a control device 107.

Referring to FIG. 1, the server 105 may be connected to the plurality of electronic devices (e.g., a first electronic device 101 and a second electronic device 102). Specifically, the server 105 may be wired or wirelessly connected to at least a portion of the plurality of electronic devices. The plurality of electronic devices may include, for example, a terminal or a desktop.

The server 105 may provide a system to the connected electronic device. The system may include a system divided into a plurality of domains. For example, the system may include a plurality of domains accessible by the plurality of electronic devices. Here, the plurality of domains may be accessed by different electronic devices. In other words, the plurality of electronic devices may have different accessible domains. However, it is merely an example, and at least a portion of electronic devices accessing at least a portion of the plurality of domains may correspond.

For example, when the plurality of domains includes a first domain and a second domain, an electronic device capable of accessing the first domain may include the first electronic device 101 and the second electronic device 102, and an electronic device capable of accessing the second domain may include the first electronic device 101.

A portion of the plurality of electronic devices may be capable of accessing a same domain. For example, the first electronic device 101 and the second electronic device 102 may be capable of accessing the first domain. Although not shown, a third electronic device may be capable of accessing the second domain. The electronic devices set to access the same domain may belong to a same group. Such group may be referred to as a vender or a team. Both the first electronic device 101 and the second electronic device 102 may use the first domain.

The first electronic device 101 and the second electronic device 102 may have different accounts to access the first domain. For example, the first electronic device 101 may correspond to a first account and the second electronic device may correspond to a second account.

The server 105 may be connected to the control device 107 that controls the server 105. The control device 107 may control a function of the server 105 or execute an operation of the server 105. In some cases, the control device 107 may display information generated by the server 105 but not be limited thereto.

Figure 2:
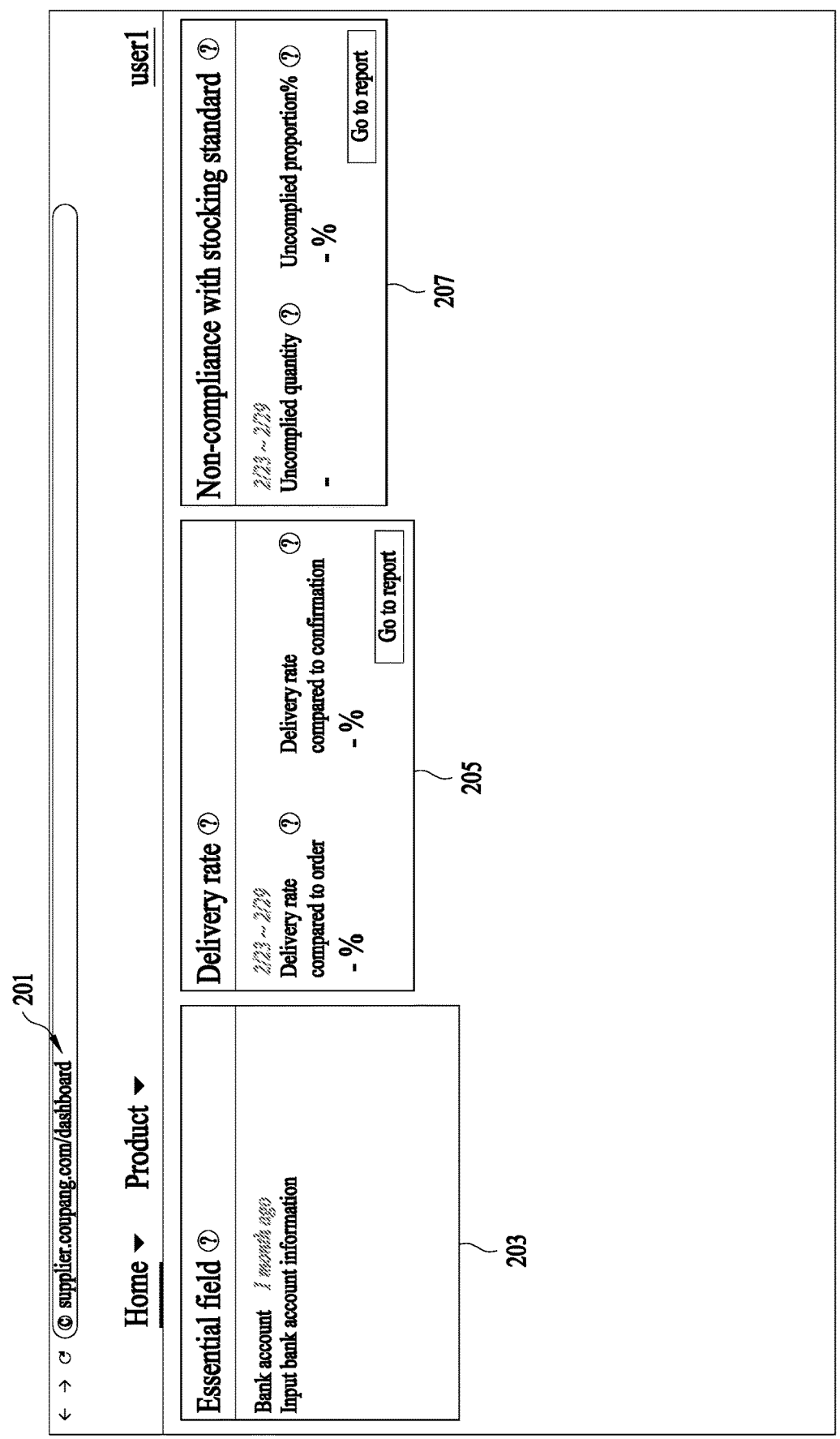
FIG. 2 is a diagram illustrating a system provided by a server according to an example embodiment.

FIG. 2 is a diagram illustrating a system provided by a server according to an example embodiment. Specifically, FIG. 2 illustrates an example of a screen of a system provided by a server (e.g., the server 105 of FIG. 1).

A server may provide a system to an electronic device based on a connection (or network) with the electronic device. The system may include, for example, a website. A variety of information associated with the system may be previously stored in the server so that the system is provided based on the information.

For example, the electronic device may receive the system from the server based on a domain of the system input in an address bar 201 of the Internet (or web browser) of the electronic device. That is, the electronic device may access the system based on the domain of the system input in the address bar 201.

In such cases, a screen as shown in FIG. 2 may be provided to the electronic device. Specifically, the screen of FIG. 2 may represent a main page of the system and may be a screen provided based on a component previously set in association with a domain.

A component may be an element of a software system implemented for reusable versatility. For example, the component may include a menu included in a page or a layout of a user interface (UI) constituting the page and a function related thereto. Depending on examples, various components may be provided and a software system may be generated by a combination of components.

Referring to FIG. 2, the component may include a first component 203, a second component 205, and a third component 207. Each component may correspond to a predetermined function. For example, the first component 203 may be a component representing an essential procedure of a user (e.g., user1) using the system, the second component 205 may be a component representing a delivery rate of items of a user (e.g., user1) using the system, and the third component 207 may be a component representing a quantity of an item that does not comply with a stocking standard.

The screen shown in FIG. 2 may be a screen related to a home tap that appears based on the home tap activated at a time of an initial access of the system. In the example of FIG. 2, when an item tab is activated based on an input to the item tab, another screen related to the item tab may be provided.

As described below, the server may acquire usage log data indicating a system use history based on the provision of the system. The system use history may include, for example, a record about a component to which an input has been applied, a record about a menu tap to which an input has been applied, a change in domain, and a change in uniform resource locator (URL) (or uniform resource identifier (URI)). The usage log data may be data indicating such use history.

The screen of FIG. 2 may be displayed on a predetermined electronic device related to the domain input in the address bar 201. Specifically, an electronic device allowed to access each of the plurality of domains included in the system may be designated (or set) in advance. In this case, an electronic device allowed to access the domain input in the address bar 201 may also be designated in advance. Based on this, the screen of FIG. 2 may be provided to the predetermined electronic device.

In some cases, at least a portion of the plurality of domains may be set to access all the plurality of electronic devices. In such cases, the screen of FIG. 1 may be provided to each of the plurality of electronic devices.

At least a portion of the plurality of domains may be accessible by the same electronic device. For example, a specific electronic device may be capable of accessing each of the portion of the plurality of domains.

Figure 3:
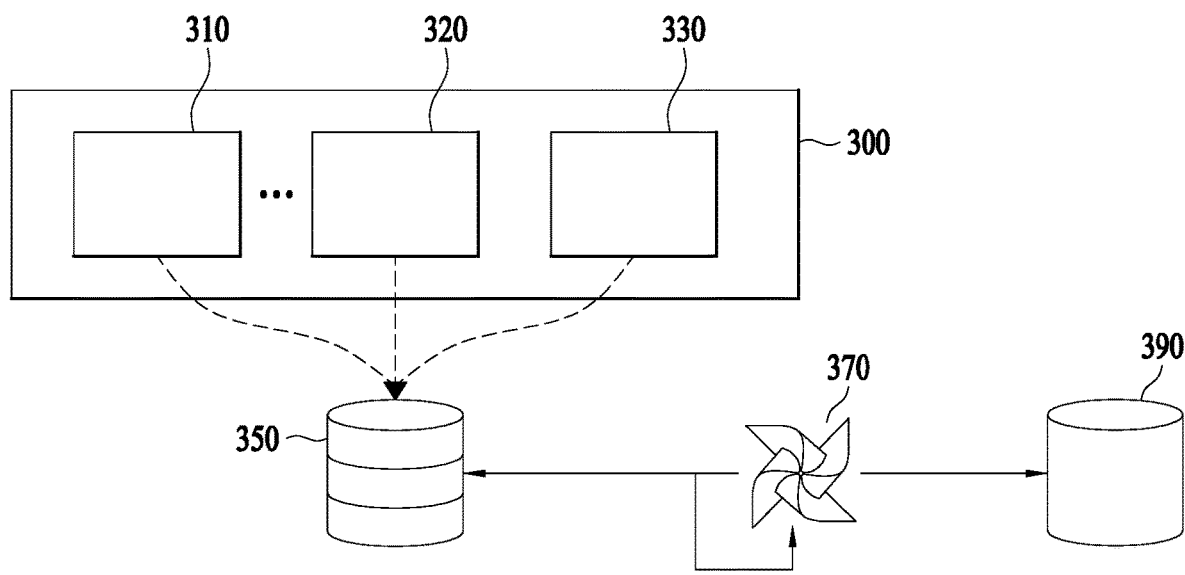
FIG. 3 is a schematic diagram illustrating a server and an operation method of the server according to an example embodiment.

FIG. 3 is a schematic diagram illustrating a server and an operation method of the server according to an example embodiment.

Referring to FIG. 3, a system 300 may include a plurality of domains. For example, the plurality of domains may include a first domain 310, a second domain 320, and a third domain 330. The plurality of domains may be accessible by different electronic devices. Usage log data indicating a use history related to a domain may be generated based on a domain use of the electronic device.

The usage log data may be generated at intervals (or in units) of a predetermined period of time based on a program provided for each domain. Various known programs may be used as a program for collecting log data as would be apparent to one skilled in the art, and redundant description will be omitted.

A server 350 may acquire usage log data associated with each of the plurality of domains from the corresponding domain. When an electronic device accesses at least a portion of the plurality of domains, the server 350 may acquire usage log data of the domain accessed by the electronic device.

The server 350 may analyze the acquired usage log data through a data processing part 370. Although FIG. 3 shows the data processing part 370 as a separate element distinguished from the server 350, it is merely an example for explanation and the data processing part 370 may be software included in a server.

The server 350 may analyze the acquired usage log data through the data processing part 370. Specifically, the server 350 may analyze information include in the usage log data. For example, the server 350 may identify which information is included in the usage log data.

The server 350 may generate total usage log data for each domain through the data processing part 370 based on the usage log data. For example, the server 350 may generate the total usage log data for each domain by arranging randomly received usage log data. Here, the total usage log data may be a set of usage log data provided for a specific domain by integrating usage log data received for a predetermined period of time, and may be generated for each of the plurality of domains.

The server 350 may generate integrated usage log data of the system by integrating the total usage log data of the plurality of domains. That is, the server 350 may generate the integrated usage log data which is overall log data of the system including the plurality of domains.

Processed usage log data may be stored in a memory 390. As illustrated, the memory 390 may be provided as an element separate from the server 350. However, it is merely an example, and the memory 390 may also be provided as an element included in the server 350.

Figure 4:
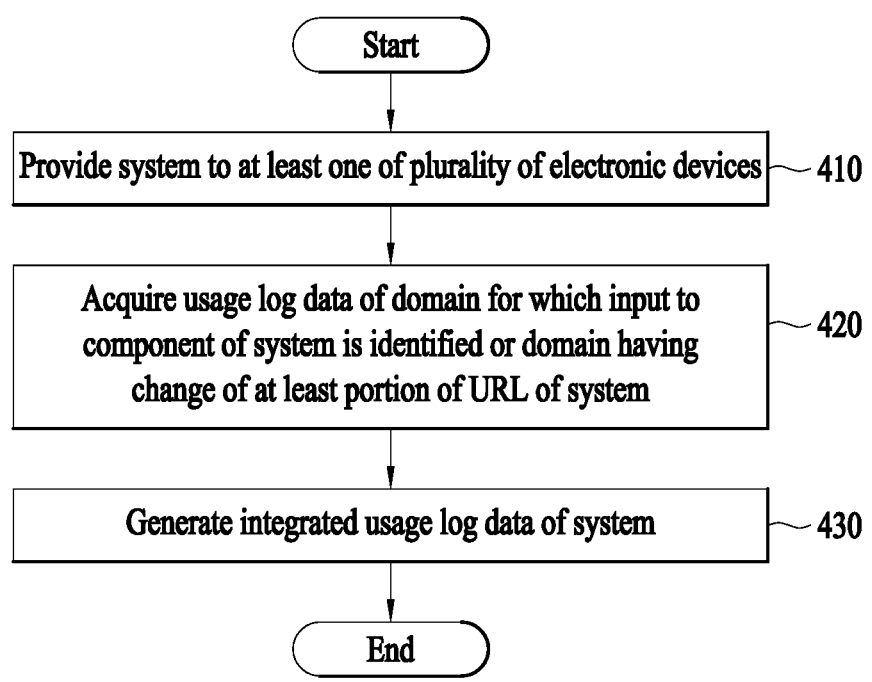
FIG. 4 is a flowchart illustrating an operation method of a server according to an example embodiment.

FIG. 4 is a flowchart illustrating an operation method of a server according to an example embodiment. Operations illustrated in FIG. 4 may be performed in different orders or irrespective of an order depending on cases. Since the descriptions made with reference to FIGS. 1 through 3 are also applicable here, repeated description of FIG. 4 will be omitted.

Referring to FIG. 4, in operation 410, a server (e.g., the server 105 of FIG. 1) may provide a system including a plurality of domains accessible by a plurality of electronic devices to at least one of the plurality of electronic devices. Specifically, the server may be connected to at least a portion of the plurality of electronic devices and provide the system to the connected electronic device.

Here, the plurality of electronic devices may be predetermined electronic devices allowed to access the system but is not limited thereto. The system may include, for example, a website but is not limited thereto. In some cases, the system may also be implemented as an application.

In the example embodiment, at least one electronic device capable of accessing each of the plurality of domains may be designated in advance. For example, when the plurality of electronic devices includes a first electronic device and a second electronic device, and when the plurality of domains includes a first domain and a second domain, the first electronic device may be designated to be capable of accessing the first domain among the plurality of domains and the second electronic device may be designated to be capable of accessing the second domain among the plurality of domains.

In some cases, at least a portion of the plurality of electronic devices may be capable of accessing two or more domains among the plurality of domains. For example, the first electronic device may be capable of accessing the first domain and the second domain and the second electronic device may be capable of accessing the first domain. In such cases, some of the electronic devices capable of accessing the plurality of domains may overlap each other.

In some cases, each domain may be accessible by a different electronic device. For example, the first domain may be accessible by the first electronic device and the second domain may be accessible by the second electronic device.

In operation 420, the server may acquire, from at least one of the plurality of electronic devices, usage log data of a domain for which an input to a component of the system is identified among the plurality of domains, or a domain having a change in at least a portion of a URL among the plurality of domains.

Each of the plurality of domains may have a component designated for the corresponding domain, so that a component is provided to an electronic device accessing a specific domain. In this case, a component-based screen (or window)

may be displayed on the electronic device. For example, a first component and a second component may be designated for the first domain. In this example, when the first electronic device accesses the first domain, the first component and the second component may be provided to the first electronic device. Thus, a screen based on the first component and the second component may be displayed on the first electronic device. Here, the first component and the second component may be a portion of a plurality of components previously designated in association with the system.

An input may be applied to at least a portion of components by a user. For example, the at least a portion of components may include a button for a user input so that an input is applied to a component based on an input (e.g., click, double-click, long click) to the button.

In the example embodiment, the server may identify a domain in which an input to a component is identified. Through this, the server may acquire usage log data of the domain from an electronic device accessing (or connecting) the domain in which the input is identified. Specifically, in response to the input to the component being identified, the server may acquire the usage log data, which is information on a use history of the domain, from the electronic device accessing the domain related to the input.

When the electronic device (or user) uses a function provided in the domain, the URL of the domain may be changed. The URL may be a text following an end of the domain and may indicate a moving path (or use history) on the domain. A related example will be described with reference to FIG. 6.

In the example embodiment, the server may identify a domain in which at least a portion of the URL is changed among the plurality of domains. The server may acquire usage log data of the identified domain from the electronic device accessing the identified domain. Specifically, in response to the change of the URL being identified, the server may acquire the usage log data from the electronic device accessing the domain in which the URL is changed.

A usage log may be a use history (or use record) of a domain, and usage log data may be data indicating the use history. For example, the usage log data may include at least one of domain information of a domain related to the input or change, time information of a time in which the input to the component is identified, time information of a time in which the URL is changed, component information of the system provided in response to the input or change, information on whether an environment related to the domain related to the input or change is a development environment, login information of the domain related to the input or change, application programming interface (API) information of the domain related to the input or change, and browser information of the domain related to the input or change.

In the example embodiment, the domain information of the domain related to the input or change may include information indicating a domain in which an input to a component or a change of the URL is made. More specifically, the domain information of a domain related to the input or change may include a detailed address of the domain in which the input to the component or the change of the URL is applied.

In the example embodiment, the time information of the time in which the input to the component is identified may be information indicating a time (or point in time) in which the input to the component is identified, and may be represented in an order of hours, minutes, and seconds. For example, the time information may be represented as "14: 55:00." The time information of a time in which the URL is changed may be information indicating a time (or point in time) in which the URL is changed and may be represented in an order of hours, minutes, and seconds, for example, "14:51:03."

In the example embodiment, in a case in which an input to a component is identified, the component information of the system provided in response to the input or change may include information on a component to which the input is applied or information on a component provided by a domain in which the input is identified. Also, in a case in which the URL is changed, the component information of the system provided in response to the input or change may include information on a component provided by a domain related to the URL before or after the URL is changed. The component information may include at least one of, for example, a name, a type, and a characteristic of the component but may not be limited thereto.

In the example embodiment, the information on whether the environment related to the domain related to the input or change is the development environment may include information on whether the input to the component or the change of the URL is made in the development environment or made in an actual operating environment. The development environment may include a development environment related to a design of a domain. The actual operating environment may include an environment in which a domain is provided to and used by a user.

In the example embodiment, the login information of the domain related to the input or change may include an identification number previously assigned to discriminate an electronic device accessing a domain in which the input to the component or the change of the URL is made or ID information of a user accessing the domain.

In the example embodiment, the API information of the domain related to the input or change may include information on a type of an API request corresponding to the input to the component or the change of the URL. Regarding the type of the API request, since it is easy for one skilled in the art, a detailed description will be omitted.

In the example embodiment, the browser information of the domain related to the input or change may be information on an Internet browser used in the electronic device to access the domain and may include information on, for example, a name or a type of the Internet browser.

Meanwhile, the usage log data is not limited to the foregoing examples and may include various information. For example, when a group is formed such that a portion of the plurality of electronic devices are allowed to access the same domain, the usage log data may include information on the group (e.g., a name of the group).

In the example embodiment, the component of the system may include identification information. The identification information may be information designated for each component, which may be added in the corresponding component at a stage of developing the system. In this case, the usage log data may include the identification information of the component.

For example, usage log data acquired based on an input of a component may include identification information included in the component to which the input is applied. As an example, the identification information of the component may include information on a type of the component or a name of the component. As another example, the identification information of the component may include a predetermined script for indicating the component. However, the present embodiment is not limited to the aforementioned examples. Component identification information may include various information indicating a component.

In the example embodiment, the server may acquire the identification information of the component to which the input is applied based on the component including the identification information. The server may identify a type or name of the component to which the input is applied based on the acquired identification information. Specifically, the server may include information on a type or name of the component corresponding to the identification information of the component and identify the type or name of the component based on the information. Based on the type or name of the component, the server may generate integrated usage log data (or total usage log data) including the identified type or name of the component.

In the example embodiment, the server may acquire the usage log data using an application previously designated for each of the plurality of domains. The designated application may include a software program such as "logstash" but is not limited thereto.

In the example embodiment, the server may acquire the usage log data at intervals of a predetermined period of time. For example, the server may acquire the usage log data from each of the plurality of domains at intervals of ten minutes. In this instance, the acquired usage log data may include, for example, data indicating a usage log in which domain use details for ten minutes is recorded. The usage log data acquired at intervals of the predetermined period of time may be collected using the application designated for each of the plurality of domains at intervals of the predetermined period of time. However, embodiments are not limited thereto.

In the example embodiment, the server may acquire usage log data at intervals of the predetermined period of time separate from the usage log data acquired in response to the input to the component or the change of the URL. For example, the server may acquire the usage log data of each of the plurality of domains at intervals of the predetermined period of time. In this example, when the input to the component or the change of the URL is identified, the server may further acquire usage log data within a predetermined range of time from an input or change point in time with respect to the domain in which the identified input or change is made.

Here, the predetermined period of time and the predetermined range of time may be specified in advance. For example, the predetermined period of time may include, but not be limited to, ten minutes and the predetermined range of time may include, but not be limited to, five minutes before and after the input or change point in time.

Depending on a case, the usage log data may be collected based on an application provided for each electronic device in response to the electronic device accessing the domain, and then transmitted to the server at intervals of the predetermined period of time or transmitted to the server in response to the input or change. Based on such transmission, the server may acquire the usage log data.

Depending on a case, the electronic device accessing each of the plurality of domains may collect the usage log data indicating the use history at intervals of the predetermined period of time and transmit the usage log data to the server. When the input or change is identified, the server may acquire, from the usage log data, use history data within the predetermined range of time from a point in time that the input or change is identified (e.g., within five minutes before or after the point in time).

Depending on an embodiment, the transmitted usage log data may be temporarily stored. In this example, the server may acquire use history data within the predetermined range of time from the temporarily stored usage log data and use the acquired use history data to generate integrated usage log data in operation 430 as described below.

In operation 430, the server may generate integrated usage log data of the system. Specifically, the server may generate integrated usage log data of the system including the plurality of domains based on the usage log data acquired in operation 420. The integrated usage log data may include data on a usage log of the entire system including the usage log data of each of the plurality of domains. In other words, the integrated usage log data may include data associated with the use history of the entire system including the plurality of domains.

In the example embodiment, the server may generate the total usage log data of each of the plurality of domains based on the acquired usage log data and integrate the generated total usage log data, thereby generating the integrated usage log data of the system. Here, the total usage log data may be a set of usage log data for one domain and may be generated for each of the plurality of domains. For example, when usage log data of the first domain includes 1-1th usage log data and 1-2th usage log data, the total usage log data of the first domain may be a total use record of the first domain generated by integrating the 1-1th usage log data and the 1-2th the usage log data.

More specifically, for each of the plurality of domains, at least one usage log data may be acquired over time. In response to the usage log data being acquired, the server may identify a domain corresponding to the acquired usage log data. The server may generate total usage log data of the identified domain by integrating the acquired usage log data and the usage log data of the identified domain acquired previously (acquired in the past). Such process of generating the total usage log data may be performed for each of the plurality of domains. Through the process, the total usage log data of each of the plurality of domains may be generated.

In the example embodiment, the usage log data may include the usage log data acquired at intervals of the predetermined period of time and the usage log data acquired in response to the input to the component or the change of the URL. In this case, the server may generate the integrated usage log data by integrating the acquired usage log data using different methods.

For example, the server may sort the usage log data acquired at intervals of the predetermined period of time and the usage log data acquired in response to the input to the component or the change of the URL in chronological order and classify the sorted usage log data by domain. Through this, the server may generate a set of usage log data sorted in the chronological order for each of the domains. The server may complete the generation of the integrated usage log data by listing the set of usage log data in an order of domain names. However, it is merely an example, and the generation of the integrated usage log data may be performed in an order different from that of the foregoing example.

In the example embodiment, the server may classify the integrated usage log data for each of the plurality of domains and provide the classified integrated usage data using at least one of a graph, a table, and an image. More specifically, the server may provide the integrated usage log data to a device connected to the server. The device connected to the server may include a control device (e.g., the control device 107 of FIG. 1) of the server or a display device including a display. In this instance, the server may provide the integrated usage log data using at least one of a graph, a table, and an image. For example, the server may provide the integrated usage log data as a single image. In this example, the single image may include graph content distinguished for each of the plurality of domains.

In the example embodiment, the graph content may include at least one of, for example, a domain use history with time, a component record having a use history, and a content record having a use history.

The domain use history with time may include information in which contents or components used in a domain are listed in descending chronological order.

The component record having the use history may include, for example, information on a component to which an input is applied. Depending on a case, the component record having the use history may be information in which component names are listed based on a number of times that an input is applied. For example, the component record having the use history may include information in which component names are listed in an order from a component with a large number of times that an input is applied to a component with a small number of times that an input is applied.

The content record having the use history may include, for example, information on content to which an input is applied. Depending on a case, the content record having the use history may be information in which content names are listed based on a number of times that an input is applied. For example, the content record having the use history may include information in which content names are listed in an order from content with a large number of times that an input is applied to content with a small number of times that an input is applied.

An example of providing the integrated usage log data will be described in detail with reference to FIG. 9.

In the example embodiment, the system may include contents related to a plurality of functions. For example, the system may include numerous contents that provide specific functions. The server may generate content usage log data indicating a domain including a content use history for each content based on the integrated usage log data. The content usage log data may be provided using at least one of a graph, a table, and an image. A related example will be described in detail with reference to FIG. 10.

Meanwhile, content may be a sub-concept of at least a portion of components and, in this case, a component may include at least one content.

In the example embodiment, the server may generate component usage log data indicating a domain use history for each component and provide the component usage log data. The component usage log data may be provided using at least one of a graph, a table, and an image. A related example will be described with reference to FIG. 10.

The content usage log data and the component usage log data may be one of methods of providing the integrated usage log data. In some cases, the content usage log data and the component usage log data may be included in the integrated usage log data.

In the example embodiment, when usage log data is additionally acquired based on an input to the component or a change of at least a portion of the URL, the server may update the integrated usage log data based on the additionally acquired usage log data. More specifically, when the usage log data is additionally acquired, the server may update the integrated usage log data by adding the additionally acquired usage log data to the integrated usage log data. In this case, the updated integrated usage log data may include information on a point in time at which the additionally acquired usage log data is acquired but is not be limited thereto.

Figure 5:
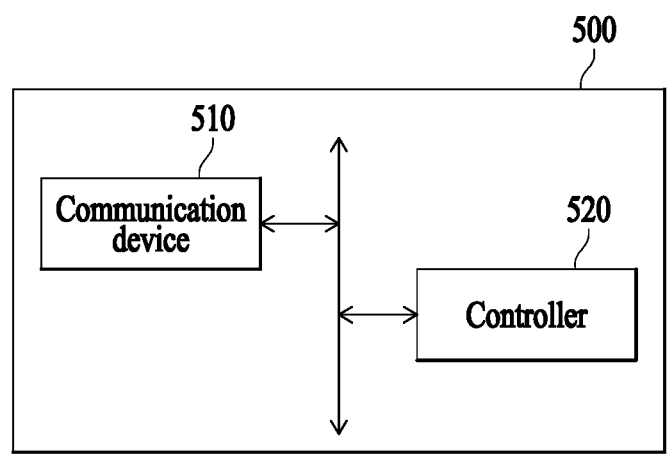
FIG. 5 is a functional block diagram of a server according to an example embodiment.

FIG. 5 is a functional block diagram of a server according to an example embodiment. FIG. 5 illustrates components related to the present embodiment. However, it is apparent to those skilled in the art that other general-purpose components may be further included in addition to the components illustrated in FIG. 5.

Referring to FIG. 5, a server 500 may include a communication device 510 and a controller 520. Each of the communication device 510 and the controller 520 may be a unit that processes at least one function or operation and may be implemented through hardware, software, or a combination of hardware and software.

The server 500 of FIG. 5 may be the server 500 that performs the operation method described with reference to FIG. 4 and thus, repeated description will be omitted.

In the example embodiment, the server 500 may be combined with at least a part of a control device (e.g., the control device 107 of FIG. 1) to be implemented as a single electronic device. In this case, the server 500 may be controlled irrespective of a connection with the control device.

Although not shown, in the example embodiment, the server 500 may further include a memory that stores a variety of data associated with the server 500. For example, at least one instruction for operating the server 500 may be stored in the memory. In this case, the communication device 510 and the controller 520 may perform various operations based on such instruction.

Depending on a case, the memory may be provided as a separate element in each of the communication device 510 and the controller 520, or may be provided as a single element that connects the communication device 510 and the controller 520. However, the present embodiment is not limited to such cases.

The communication device 510 may provide a system to at least one of a plurality of electronic devices. Here, the system may be a system including the plurality of domains accessible by (or to be connected to) the plurality of electronic devices, that is, a system divided into the plurality of domains. The communication device 510 may provide the system to at least one of the plurality of electronic devices capable of accessing the plurality of domains of the system.

In the example embodiment, the at least one electronic device to which the system is provided may include an electronic device connected with the server 500 among the plurality of electronic devices. However, it is merely an example, and the system may be provided to each of the plurality of electronic devices irrespective of the connection.

Once the system is provided, a screen related to the system may be displayed on the electronic device. In this case, a different function may be provided to each domain of the system so a different screen is displayed for each accessed domain. The description of FIG. 2 or 6 can be referenced as an example of the displayed screen.

In the example embodiment, an electronic device capable of accessing each of the plurality of domains may be designated in advance. In this instance, a different electronic device may be designated to access each of the domains. However, it is merely an example and, in some cases, at least a portion of the domains may be set to be accessible by the same electronic device.

The communication device 510 may acquire usage log data of a domain in which an input to a component of the system is identified among the plurality of domains. For example, the communication device 510 may acquire the usage log data from the electronic device accessing the domain in which the input to the component of the system is identified among the plurality of electronic devices. Here, the acquired usage log data may be usage log data associated with the input to the component and may include, for example, usage log data associated with a domain use history before or after the input is applied (or before or after a predetermined period of time from the applying of the input).

The communication device 510 may acquire usage log data associated with a domain having a change of at least a portion of a URL among the plurality of domains. For example, the communication device 510 may acquire the usage log data from the electronic device accessing the domain in which the URL is changed among the plurality of electronic devices. Here, the acquired usage log data may be usage log data associated with the change of the URL, and may include usage log data associated with a domain use history before or after the URL is changed (or before or after a predetermined period of time from the applying of the input).

In the example embodiment, the communication device 510 may acquire the usage log data associated with each of the plurality of domains at intervals of a predetermined period of time. Specifically, the communication device 510 may acquire usage log data of a domain accessed by each electronic device from an electronic device connected to the communication device 510 at intervals of the predetermined period of time. Here, the acquired usage log data may be data indicating a domain use history collected at intervals of the predetermined period of time. For example, the usage log data may include information on content used by an electronic device and information on a utilization time among domains but is not limited thereto.

In the example embodiment, the communication device 510 may acquire usage log data separate from the acquired usage log data at intervals of the predetermined period of time in response to the input to the component or the change of the URL. For example, the communication device 510 may acquire the usage log data of each of the plurality of domains at intervals of the predetermined period of time. In this example, when the input to the component or the change of the URL is identified, the communication device 510 may further acquire usage log data within a predetermined range of time from an input or change point in time with respect to the domain in which the identified input or change is made. In this instance, the predetermined period of time and the predetermined range of time may be specified in advance. For example, the predetermined period of time may include, but not be limited to, ten minutes and the predetermined range of time may include, but not be limited to, five minutes before and after the input or change point in time.

Depending on a case, the usage log data may be collected based on an application provided for each electronic device in response to the electronic device (e.g., the plurality of electronic devices of FIG. 1) accessing the domain and transmitted to the server 500 at intervals of the predetermined period of time, or may be collected in response to the input or change and transmitted to the server 500. Based on such transmission, the communication device 510 may acquire the usage log data.

Depending on a case, the electronic device accessing each of the plurality of domains may collect the usage log data indicating the use history at intervals of the predetermined period of time and transmit the usage log data to the server 500. The communication device 510 may receive the transmitted usage log data. Also, when the input or change is identified, the controller 520 may acquire, from the received usage log data, use history data within the predetermined range of time from a point in time that the input or change is identified (e.g., within five minutes before or after the point in time).

Depending on an embodiment, the transmitted usage log data may be temporarily stored in the server 500. In this case, the controller 520 may acquire use history data within the predetermined range of time from the temporarily stored usage log data and use the acquired use history data to generate integrated usage log data as described later.

In the example embodiment, the controller 520 may generate integrated usage log data of the system based on the acquired usage log data. More specifically, the controller 520 may generate integrated usage log data indicating system use history by integrating the acquired usage log data. The integrated usage log data may be data indicating all (or together) use histories of the plurality of domains.

In the example embodiment, the controller 520 may generate total usage log data for each of the plurality of domains based on the acquired usage log data. Specifically, the controller 520 may classify the usage log data acquired from each of the plurality of domains for each domain, thereby generating the total usage log data for each of the plurality of domains. The total usage log data may include various information on a use history of one domain, that is, a portion used in a domain. For example, the total usage log data may include information on a component or content used in the domain with time.

The controller 520 may generate the integrated usage log data by integrating the total usage log data. For example, the controller 520 may integrate the total usage log data, thereby generating the integrated usage log data provided as one data.

In the example embodiment, the integrated usage log data may be classified for each domain. Also, the integrated usage log data may be provided using at least one of a graph, a table, and an image.

In the example embodiment, when the usage log data is additionally acquired through the communication device 510 based on an input to the component or a change of at least a portion of the URL, the controller 520 may update the integrated usage log data based on the additionally acquired usage log data. Specifically, the controller 520 may update the integrated usage log data by merging the additionally acquired usage log data with the existing integrated usage log data.

Although FIG. 5 illustrates the server 500 including the communication device 510 and the controller 520 as an example, embodiments are not limited thereto. For example, the server 500 may be embodied to include a memory and a processor. In this case, operations of the communication device 510 and the controller 520 may be executed by a processor as would be apparent to one skilled in the art and thus, redundant description will be omitted.

Figure 6:
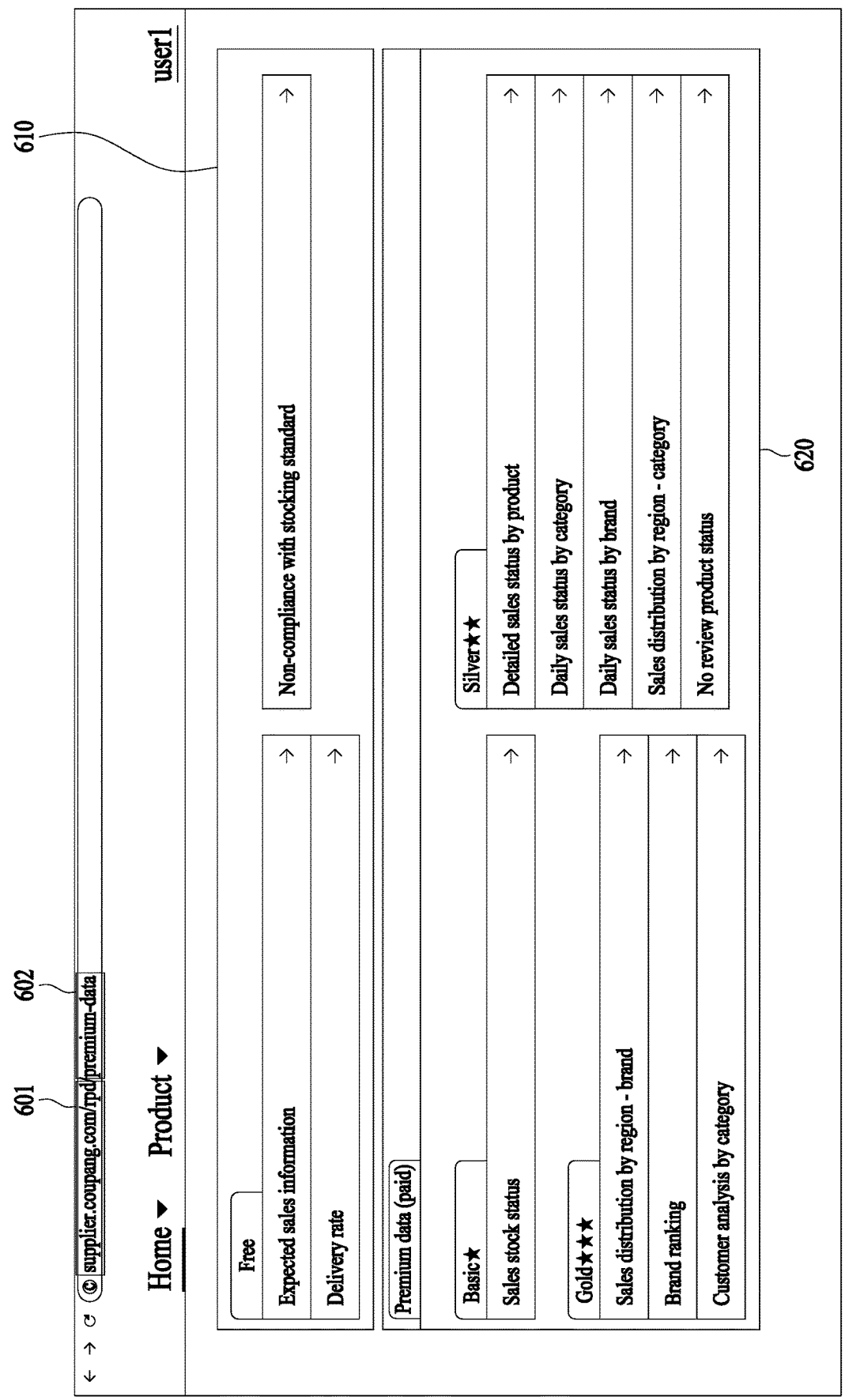
FIG. 6 is a diagram illustrating a screen provided in a system provided by a server according to an example embodiment.

FIG. 6 is a diagram illustrating a screen provided in a system provided by a server according to an example embodiment. Specifically, FIG. 6 illustrates an example of a screen provided through a specific domain.

In response to an electronic device accessing a domain 601, a screen of FIG. 6 may be displayed on the electronic device. Here, the electronic device may be a device previously designated to be allowed to access the domain 601. The screen of FIG. 6 is an example of one of various screens provided based on the domain 601.

More specifically, when the domain 601 is provided in an address bar of an Internet browser window as illustrated, the electronic device may provide a screen related to the domain 601. In this instance, an initially provided screen may be, for example, the screen described with reference to FIG. 2.

If an input to specific content or component is applied, the domain 601 may provide another screen corresponding to the input. As such, by using a specific function of a system provided by the domain 601, a URL 602 may be displayed in accordance with a path of the used function. The URL 602 may be changed based on the displayed screen or a path. For example, when a screen different from that of FIG. 6 is provided to the electronic device, the URL 602 may be changed to another text.

Meanwhile, referring to FIG. 6, content (e.g., first content 610, second content 620) of the system may be provided to the electronic device. The first content 610 may be free system content (e.g., expected sales information, non-compliance with stocking standards, delivery rate) to be used by a user of the domain 601. The second content 620 may be paid system content (for example, sales stock status, sales distribution by region—brand, brand ranking, customer analysis by category, detailed sales status by product, daily sales status by category, daily sales status by brand, category of sales distribution by region, and no review product status) to be used by a user of the domain 601. Content of FIG. 6 may represent functions provided by the system, and at least a portion of the contents may be changed based on an implementation in various ways.

If an input to content is applied, a function corresponding to the input (or corresponding to the content to which the input is applied) may be provided, so that a screen corresponding to the provided function is displayed on the electronic device. In this case, a server connected to the electronic device may acquire the usage log data indicating the use history related to the domain 601 in response to the input.

Depending on an embodiment, usage log data associated with a use history such as a system usage process and usage function may be collected starting from a point in time at which the electronic device accesses the domain 601. The server may acquire the usage log data at intervals of a predetermined period of time based on the connection with the electronic device. In this case, the acquired usage log data may be data in units of the predetermined period of time but is not limited thereto. For example, all of accumulated usage log data may also be acquired as the acquired usage log data.

Depending on an embodiment, the first content 610 may correspond to the first component and the second content 620 may correspond to the second component. In this case, the server may acquire the usage log data in response to the input to the component. The acquire usage log data may include information on the component to which the input is applied.

Figure 7:
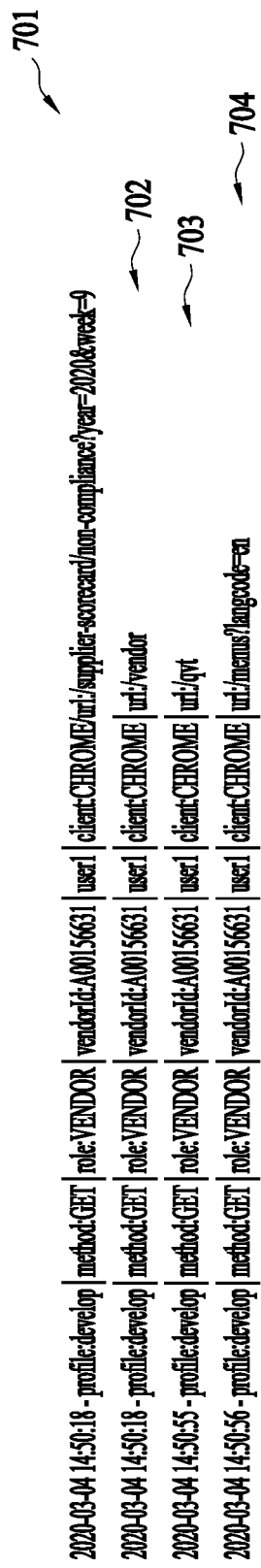
FIGS. 7 and 8 are diagrams illustrating usage log data of a domain acquired by a server according to an example embodiment.
Figure 8:
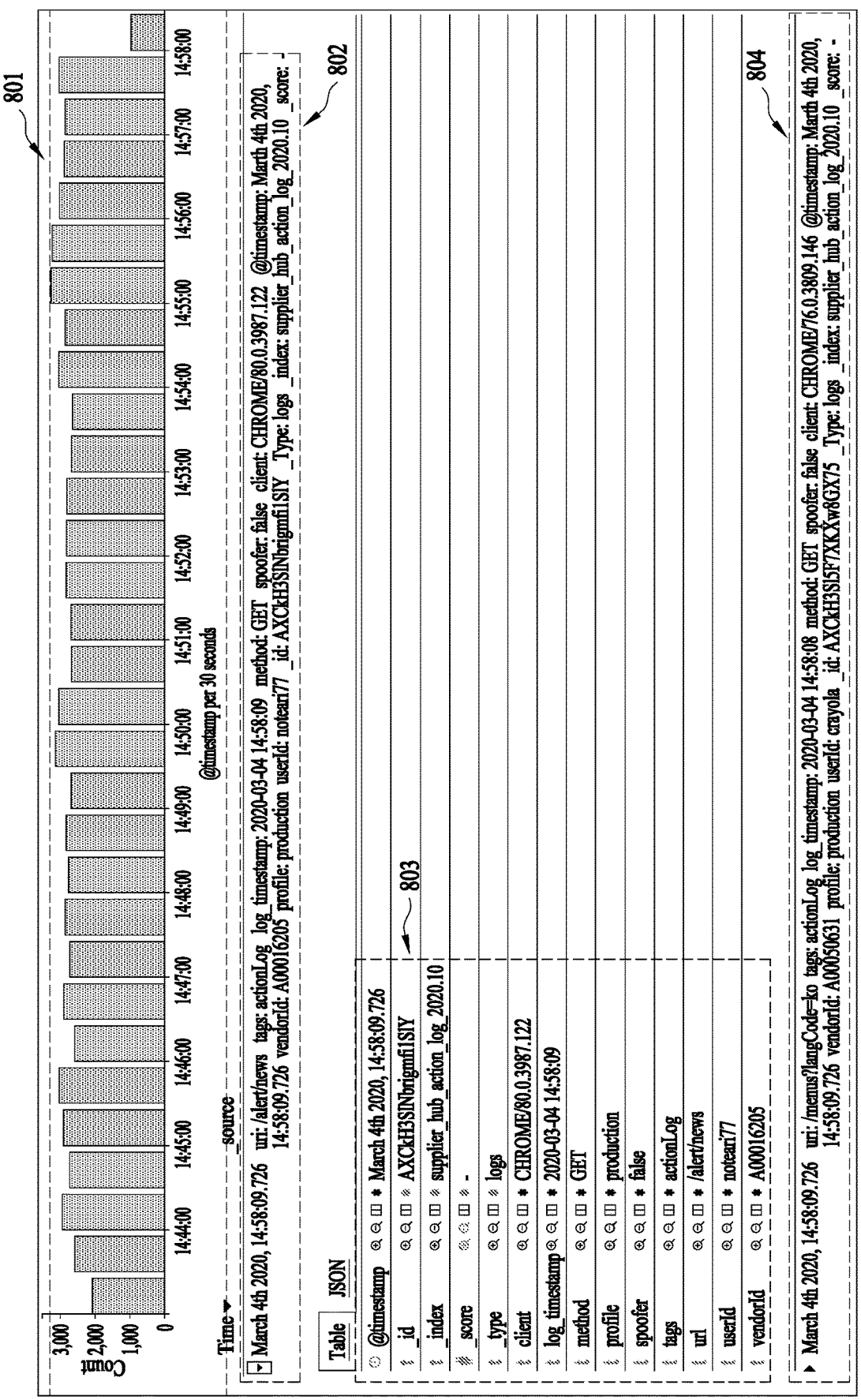

FIGS. 7 and 8 are diagrams illustrating usage log data of a domain acquired by a server according to an example embodiment. Specifically, FIG. 7 illustrates an example of four usage log data acquired for a specific domain and FIG. 8 illustrates an example of analysis information of acquired usage log data.

Referring to FIG. 7, usage log data may include various information. As shown in FIG. 7, the usage log data may include information on a time (e.g., 14:50:18), information on whether an environment related to a domain is a development environment (e.g., develop), information on an API request type of a domain (e.g., GET, GET being a kind of API type), information on a group to which an electronic device capable of accessing a specific domain belongs (e.g., VENDOR, VENDOR being a group name), identification information on a group including an electronic device (e.g., A00156631), login information of an account having actually accessed a domain (e.g., user1), browser information of a domain (e.g., CHROME, CHROME being a browser name), and URL information (e.g., /vendor). However, the aforementioned information of FIG. 7 is merely an example, and embodiments are not limited thereto.

The server may analyze the usage log data and provide the analysis information. FIG. 8 illustrates an example of the analysis information.

Referring to FIG. 8, the analysis information may include count information 801 obtained by analyzing, based on a time, a number of times that usage log data is acquired, extraction information (e.g., first extraction information 802 and second extraction information 804) obtained by extracting information included in one usage log data, and table information 803 generated by tabularizing extracted information.

Figure 9:
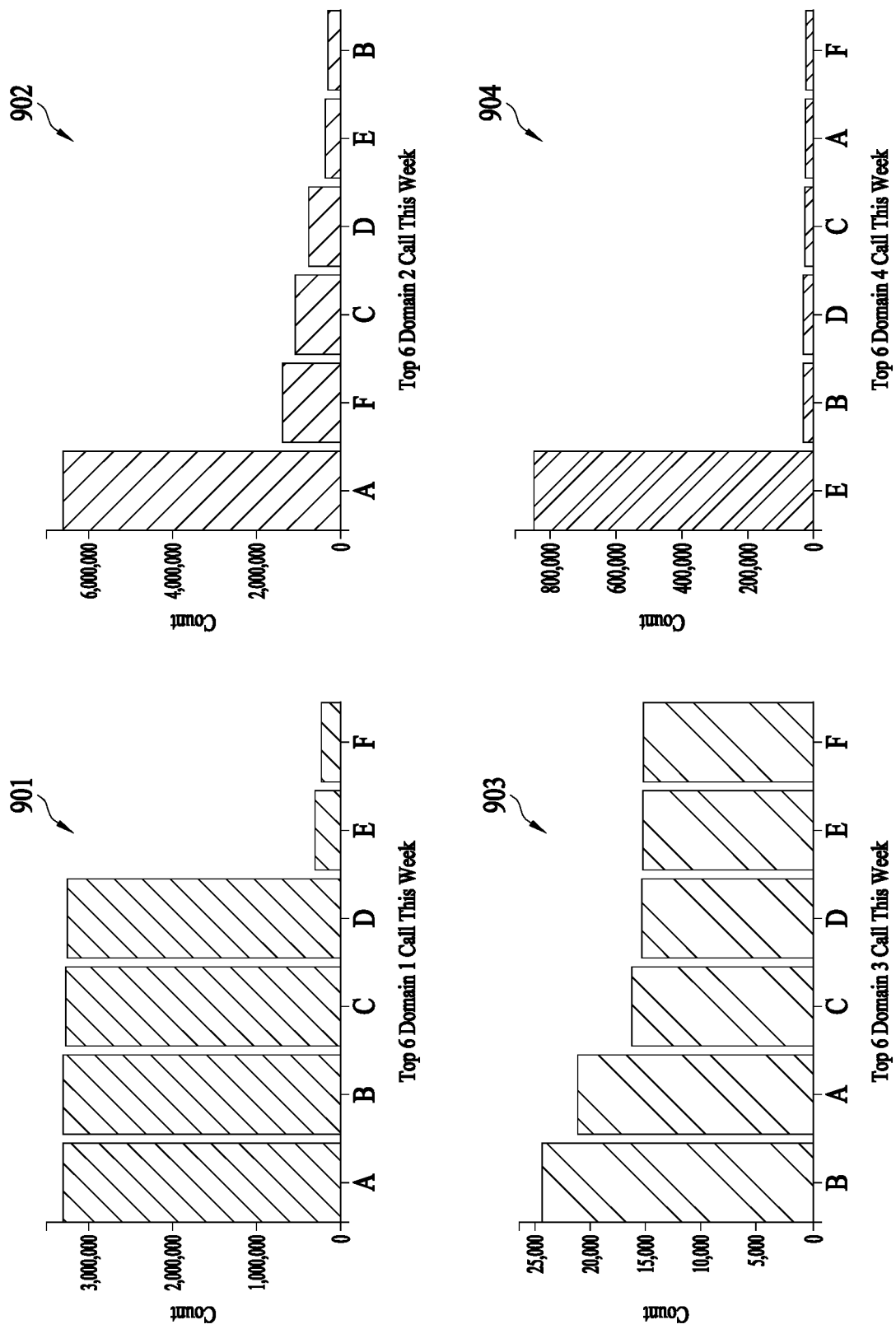
FIG. 9 is a diagram illustrating integrated usage log data of a system provided by a server according to an example embodiment.

FIG. 9 is a diagram illustrating integrated usage log data of a system provided by a server according to an example embodiment. Specifically, FIG. 9 illustrates an example of integrated usage log data represented separately for each domain.

Referring to FIG. 9, a server may provide integrated usage log data in forms of graphs representing a log 901 related to a first domain, a log 902 related to a second domain, a log 903 related to a third domain, and a log 904 related to a fourth domain. Each log may include information associated with a use history for each domain. For example, information in which contents A, B, C, D, E, and F having use details for each domain are sorted based on a number of uses may be provided as illustrated. In each of the graphs, an x axis represents content and a y axis represents the number of uses for each content.

Although FIG. 9 shows the integrated usage log data in a form of a bar graph, embodiments of the present disclosure are not limited thereto. For example, the integrated usage log data may be represented in a form of a table or pie graph as shown in FIG. 10.

Figure 10:
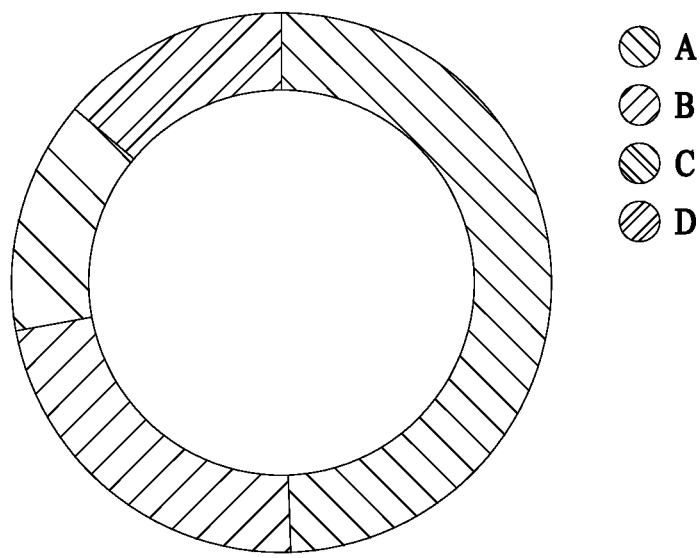
FIG. 10 is a diagram illustrating content usage log data of a system provided by a server according to an example embodiment.

FIG. 10 is a diagram illustrating content usage log data of a system provided by a server according to an example embodiment. Specifically, FIG. 10 illustrates an example of content usage log data indicating information on a domain using specific content.

Referring to FIG. 10, a server may provide content usage log data in a form of a graph or image. The content usage log data may be a ratio at which first content is used for each domain. Here, domains may be denoted by A, B, C, and D. It can be known from FIG. 10 that the first content is used at a greatest ratio in a domain A.

Although FIG. 10 shows the content usage log data in a form of a pie graph, embodiments are not limited thereto. The content usage log data may be represented in a form of a table or bar graph as shown in FIG. 9.

Meanwhile, in some cases, a server may provide information indicating a usage log for each component. In such cases, the server may provide component usage log data by generating the component usage log data in a manner corresponding to the generation and provision of the content usage log data.

According to the present disclosure, a server and an operation method thereof may acquire usage log data from each of a plurality of domains, generate integrated usage log data for an entire system including the plurality of domains, and provide the integrated usage log data, so that an analysis of a log of the entire system divided into the plurality of domains is performed with increased efficiency.

Also, the server and the operation method thereof may acquire usage log data based on an input to a component of a domain or a change of a URL such that usage log data of an appropriate time point for analysis is selectively acquired. Through this, integrated usage log data may be more easily and efficiently generated and analyzed.

The apparatus described herein may include a permanent storage such as a disk drive, a communication port for handling communications with external devices, and user interface devices such as a touch panel, a key, and a button. The methods that are implemented as software modules or algorithms may be stored as program instructions or computer-readable codes executable by the processor on a computer-readable recording medium. Here, examples of the computer-readable recording medium include magnetic storage media (e.g., read only memory (ROM), random access memory (RAM), floppy disk, or hard disk), optically readable media (e.g., compact disk-read only memory (CD-ROM) or digital versatile disk (DVD)), etc. The computer-readable recording medium may be distributed over network coupled computer systems, and thus, the computer-readable code may be stored and executed in a distributed fashion. This medium may be read by the computer, stored in the memory, and executed by the processor.

The present embodiments may be described in terms of functional block components and various processing steps. Such functional blocks may be realized by any number of hardware and/or software components configured to perform specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of conventional techniques for electronics configuration, signal processing and/or control, data processing and the like. The terms "mechanism," "element," "means," and "configuration" are used broadly and are not limited to mechanical or physical embodiments. These terms may include meaning of a series of routines of software in association with a processor, for example.

The above-described embodiments are merely examples, and other embodiments may be implemented within the scope of the following claims.

What is claimed is:

1. An operation method of a server, the method comprising:
    providing a system comprising a plurality of domains, wherein the plurality of domains are accessible by a plurality of electronic devices, wherein one or more domains of the plurality of domains are accessible by at least one electronic device of the plurality of electronic devices, wherein each domain of the one or more domains provides one or more or components for the at least one electronic device accessing the particular domain, wherein the at least one electronic device collects usage log data for each of the one or more domains;
    identifying a modification of at least a portion of a uniform resource locator (URL) for a domain of the one or more domains, wherein the modification of the at least a portion of the URL for the domain is based on the at least one electronic device using a function provided by a component of the domain;
    in response to identifying the modification of the at least a portion of the URL for the domain, acquiring, from the at least one electronic device accessing the domain, a portion of usage log data of the domain corresponding to the modification of the at least a portion of the URL; and
    generating integrated usage log data of the system by integrating the usage log data for each domain of the plurality of domains, wherein the integrated usage log data corresponds to a modification of at least a portion of a URL for each domain of the plurality of domains.

2. The operation method of claim 1, wherein the plurality of electronic devices comprises a plurality of access-allowed electronic devices, wherein at least one electronic device of the plurality of electronic devices is designated for each domain of the plurality of domains, and wherein the plurality of electronic devices comprises a first electronic device capable of accessing a first domain among the plurality of domains and a second electronic device capable of accessing a second domain among the plurality of domains.

3. The operation method of claim 1, wherein acquiring the usage log data of the domain is further based at least in part on identifying an input to the component of the domain, wherein the component comprises identification information, and wherein acquiring the portion of the usage log data of the domain comprises acquiring the identification information of the component corresponding to the input.

4. The operation method of claim 3, further comprising:
    identifying information on a type of the component or a name of the component based on the identification information, the integrated usage log data comprising the type of the component or the name of the component.

5. The operation method of claim 1, further comprising:
    acquiring the usage log data for each domain of the plurality of domains at predetermined time intervals,
    wherein the usage log data for each domain of the plurality of domains acquired at the predetermined time intervals is collected at the predetermined time intervals using an application designated for each domain of the plurality of domains.

6. The operation method of claim 5, wherein the generating of the integrated usage log data comprises:
    generating the integrated usage log data based on usage log data for each domain of the plurality of domains acquired in accordance with the modification of the at least a portion of the URL for the domain and the usage log data for each domain of the plurality of domains acquired at the predetermined time intervals.

7. The operation method of claim 1, wherein the usage log data for each domain of the plurality of domains comprises one or more of domain information of the domain corresponding to the modification of the at least a portion of the URL for the domain, time information of a time corresponding to the modification of the at least a portion of the URL for the domain, component information of the system provided in response to the modification of the at least a portion of the URL for the domain, information on whether an environment related to the domain associated with the modification of the at least a portion of the URL for the domain is a development environment, login information of the domain related to the modification of the at least a portion of the URL for the domain, application programming interface (API) information of the domain related to the modification of the at least a portion of the URL for the domain, and browser information of the domain related to the modification of the at least a portion of the URL for the domain.

8. The operation method of claim 1, wherein the domain comprises a first domain, the system further comprising content associated with each function of a plurality of functions, the operation method further comprising:
   generating content usage log data indicating a second domain, the second domain comprising a content use history for the content based on the integrated usage log data.

9. The operation method of claim 8, wherein the content usage log data corresponds to one or more of a graph, a table, or an image.

10. The operation method of claim 1, further comprising:
    providing the integrated usage log data via one or more of a graph, a table, or an image, wherein the integrated usage log data is distinguished for each domain of the plurality of domains.

11. The operation method of claim 1, further comprising:
    updating the integrated usage log data based on additionally acquired usage log data to generate updated integrated usage log data, wherein the additionally acquired usage log data is acquired based on an input to the component of the domain or the modification of the at least a portion of the URL,
    wherein the updated integrated usage log data comprises information based at least in part on a time the additionally acquired usage log data is acquired.

12. The operation method of claim 1, wherein the generating of the integrated usage log data comprises:
    generating total usage log data for each domain of the plurality of domains; and
    generating the integrated usage log data by integrating the total usage log data for each domain of the plurality of domains.

13. The operation method of claim 12, wherein the generating of the total usage log data comprises:

identifying the domain corresponding to a particular portion of usage log data;
integrating the particular portion of usage log data and previously acquired usage log data of the domain; and
generating the total usage log data for the domain.

14. A server comprising:
a wireless communication device, the wireless communication device in communication with memory to obtain and store a portion of usage log data in the memory, the wireless communication device configured to:
    provide a system comprising a plurality of domains, wherein the plurality of domains are accessible by a plurality of electronic devices, wherein one or more domains of the plurality of domains are accessible by at least one electronic device of the plurality of electronic devices, wherein each domain of the one or more domains provides one or more or components for the at least one electronic device accessing the particular domain, wherein the at least one electronic device collects usage log data for each of the one or more domains;
    identify a modification of at least a portion of a uniform resource locator (URL) for a domain of the one or more domains, wherein the modification of the at least a portion of the URL for the domain is based on the at least one electronic device using a function provided by a component of the domain;
    in response to identifying the modification of the at least a portion of the URL for the domain, acquire, from the at least one electronic device accessing the domain, the portion of usage log data of the domain corresponding to the modification of the at least a portion of the URL; and
a controller, the controller in communication with the memory to obtain the portion of usage log data from the memory, the controller configured to:
    generate integrated usage log data of the system by integrating the usage log data for each domain of the plurality of domains, wherein the integrated usage log data corresponds to a modification of at least a portion of a URL for each domain of the plurality of domains.

15. A non-transitory computer-readable recording medium comprising a computer program for performing the operation method of claim 1.

* * * * *